(12) United States Patent
Hirsch et al.

(10) Patent No.: US 10,297,911 B2
(45) Date of Patent: *May 21, 2019

(54) ANTENNA FOR USE IN A WEARABLE DEVICE

(71) Applicant: BRAGI GmbH, München (DE)

(72) Inventors: Eric Christian Hirsch, München (DE); Nikolaj Hviid, München (DE)

(73) Assignee: BRAGI GmbH, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/949,740

(22) Filed: Apr. 10, 2018

(65) Prior Publication Data
US 2018/0241117 A1    Aug. 23, 2018

Related U.S. Application Data

(63) Continuation of application No. 15/349,975, filed on Nov. 11, 2016, now Pat. No. 9,972,895, which is a
(Continued)

(51) Int. Cl.
*H04W 4/00*    (2018.01)
*H04B 5/02*    (2006.01)
(Continued)

(52) U.S. Cl.
CPC ........... *H01Q 1/273* (2013.01); *H01Q 1/2291* (2013.01); *H01Q 1/38* (2013.01); *H01Q 7/08* (2013.01);
(Continued)

(58) Field of Classification Search
CPC .......... H04R 1/10; H04R 25/554; H01Q 1/12; H01Q 1/22; H01Q 1/27; H01Q 7/08;
(Continued)

(56) References Cited

U.S. PATENT DOCUMENTS 2,325,590 A    8/1943    Carlisle et al.
2,430,229 A    11/1947   Kelsey
(Continued)

FOREIGN PATENT DOCUMENTS

CN    204244472 U    4/2015
CN    104683519 A    6/2015
(Continued)

OTHER PUBLICATIONS

Stretchgoal—The Carrying Case for The Dash (Feb. 12, 2014).
(Continued)

*Primary Examiner* — Blane J Jackson
(74) *Attorney, Agent, or Firm* — Goodhue, Coleman & Owens, P.C.

(57) ABSTRACT

An earpiece includes a housing, a first short-range transceiver for far field communication disposed within the housing, and a second short range transceiver for near field communication disposed within the housing. The second short range transceiver for near field communications comprises an antenna formed from a plurality of coil turns. There is a battery disposed within the housing. The earpiece further includes a first generally planar printed circuit board disposed within the housing and a second generally planar printed circuit board disposed within the housing. There is a flexible connector between circuit boards. The battery is positioned between the first generally planar printed circuit board and the second generally planar printed circuit board. The antenna is mounted perpendicularly to the plurality of components mounted on the first generally planar printed circuit board to thereby reduce electromagnetic interference.

19 Claims, 11 Drawing Sheets

Related U.S. Application Data continuation of application No. 14/941,639, filed as application No. PCT/EP2016/070216 on Aug. 26, 2016, now Pat. No. 9,866,282.

(60) Provisional application No. 62/211,725, filed on Aug. 29, 2015, provisional application No. 62/254,591, filed on Nov. 12, 2015.

(51) Int. Cl.

| | |
|---|---|
| *H04B 1/3827* | (2015.01) |
| *H04B 5/00* | (2006.01) |
| *H01Q 1/12* | (2006.01) |
| *H01Q 7/08* | (2006.01) |
| *H01Q 1/27* | (2006.01) |
| *H01Q 1/22* | (2006.01) |
| *H01Q 1/38* | (2006.01) |
| *H04W 4/80* | (2018.01) |

(52) U.S. Cl.
CPC ............ *H04B 1/385* (2013.01); *H04B 5/0031* (2013.01); *H04B 5/0081* (2013.01); *H04W 4/80* (2018.02)

(58) Field of Classification Search
CPC ........ H04B 5/00; H04B 5/006; H04B 5/0081; H04B 5/02; H04W 4/008; H04W 4/00
See application file for complete search history.

(56) References Cited

U.S. PATENT DOCUMENTS

| | | | |
|---|---|---|---|
| 3,047,089 A | 7/1962 | Swislocki | |
| D208,784 S | 10/1967 | Sanzone | |
| 3,586,794 A | 6/1971 | Michaelis | |
| 3,696,377 A | 10/1972 | Wall | |
| 3,934,100 A | 1/1976 | Harada | |
| 3,983,336 A | 9/1976 | Malek et al. | |
| 4,069,400 A | 1/1978 | Johanson et al. | |
| 4,150,262 A | 4/1979 | Ono | |
| 4,334,315 A | 6/1982 | Ono et al. | |
| D266,271 S | 9/1982 | Johanson et al. | |
| 4,375,016 A | 2/1983 | Harada | |
| 4,588,867 A | 5/1986 | Konomi | |
| 4,617,429 A | 10/1986 | Bellafiore | |
| 4,654,883 A | 3/1987 | Iwata | |
| 4,682,180 A | 7/1987 | Gans | |
| 4,791,673 A | 12/1988 | Schreiber | |
| 4,852,177 A | 7/1989 | Ambrose | |
| 4,865,044 A | 9/1989 | Wallace et al. | |
| 4,984,277 A | 1/1991 | Bisgaard et al. | |
| 5,008,943 A | 4/1991 | Arndt et al. | |
| 5,185,802 A | 2/1993 | Stanton | |
| 5,191,602 A | 3/1993 | Regen et al. | |
| 5,201,007 A | 4/1993 | Ward et al. | |
| 5,201,008 A | 4/1993 | Arndt et al. | |
| D340,286 S | 10/1993 | Seo | |
| 5,280,524 A | 1/1994 | Norris | |
| 5,295,193 A | 3/1994 | Ono | |
| 5,298,692 A | 3/1994 | Ikeda et al. | |
| 5,343,532 A | 8/1994 | Shugart | |
| 5,347,584 A | 9/1994 | Narisawa | |
| 5,363,444 A | 11/1994 | Norris | |
| 5,444,786 A | 8/1995 | Raviv | |
| D367,113 S | 2/1996 | Weeks | |
| 5,497,339 A | 3/1996 | Bernard | |
| 5,606,621 A | 2/1997 | Reiter et al. | |
| 5,613,222 A | 3/1997 | Guenther | |
| 5,654,530 A | 8/1997 | Sauer et al. | |
| 5,692,059 A | 11/1997 | Kruger | |
| 5,721,783 A | 2/1998 | Anderson | |
| 5,748,743 A | 5/1998 | Weeks | |
| 5,749,072 A | 5/1998 | Mazurkiewicz et al. | |
| 5,771,438 A * | 6/1998 | Palermo | H02J 7/025 455/41.1 |
| D397,796 S | 9/1998 | Yabe et al. | |
| 5,802,167 A | 9/1998 | Hong | |
| 5,844,996 A | 12/1998 | Enzmann et al. | |
| D410,008 S | 5/1999 | Almqvist | |
| 5,929,774 A | 7/1999 | Charlton | |
| 5,933,506 A | 8/1999 | Aoki et al. | |
| 5,949,896 A | 9/1999 | Nageno et al. | |
| 5,987,146 A | 11/1999 | Pluvinage et al. | |
| 6,021,207 A | 2/2000 | Puthuff et al. | |
| 6,054,989 A | 4/2000 | Robertson et al. | |
| 6,081,724 A | 6/2000 | Wilson | |
| 6,084,526 A | 7/2000 | Blotky et al. | |
| 6,094,492 A | 7/2000 | Boesen | |
| 6,111,569 A | 8/2000 | Brusky et al. | |
| 6,112,103 A | 8/2000 | Puthuff | |
| 6,157,727 A | 12/2000 | Rueda | |
| 6,167,039 A | 12/2000 | Karlsson et al. | |
| 6,181,801 B1 | 1/2001 | Puthuff et al. | |
| 6,185,152 B1 | 2/2001 | Shen | |
| 6,208,372 B1 | 3/2001 | Barraclough | |
| 6,230,029 B1 | 5/2001 | Yegiazaryan et al. | |
| 6,275,789 B1 | 8/2001 | Moser et al. | |
| 6,339,754 B1 | 1/2002 | Flanagan et al. | |
| D455,835 S | 4/2002 | Anderson et al. | |
| 6,408,081 B1 | 6/2002 | Boesen | |
| 6,424,820 B1 | 7/2002 | Burdick et al. | |
| D464,039 S | 10/2002 | Boesen | |
| 6,470,893 B1 | 10/2002 | Boesen | |
| D468,299 S | 1/2003 | Boesen | |
| D468,300 S | 1/2003 | Boesen | |
| 6,542,721 B2 | 4/2003 | Boesen | |
| 6,560,468 B1 | 5/2003 | Boesen | |
| 6,563,301 B2 | 5/2003 | Gventer | |
| 6,654,721 B2 | 11/2003 | Handelman | |
| 6,664,713 B2 | 12/2003 | Boesen | |
| 6,690,807 B1 | 2/2004 | Meyer | |
| 6,694,180 B1 | 2/2004 | Boesen | |
| 6,718,043 B1 | 4/2004 | Boesen | |
| 6,738,485 B1 | 5/2004 | Boesen | |
| 6,748,095 B1 | 6/2004 | Goss | |
| 6,754,358 B1 | 6/2004 | Boesen et al. | |
| 6,784,873 B1 | 8/2004 | Boesen et al. | |
| 6,823,195 B1 | 11/2004 | Boesen | |
| 6,852,084 B1 | 2/2005 | Boesen | |
| 6,879,698 B2 | 4/2005 | Boesen | |
| 6,892,082 B2 | 5/2005 | Boesen | |
| 6,920,229 B2 | 7/2005 | Boesen | |
| 6,952,483 B2 | 10/2005 | Boesen et al. | |
| 6,987,986 B2 | 1/2006 | Boesen | |
| 7,010,137 B1 | 3/2006 | Leedom et al. | |
| 7,113,611 B2 | 9/2006 | Leedom et al. | |
| D532,520 S | 11/2006 | Kampmeier et al. | |
| 7,136,282 B1 | 11/2006 | Rebeske | |
| 7,203,331 B2 | 4/2007 | Boesen | |
| 7,209,569 B2 | 4/2007 | Boesen | |
| 7,215,790 B2 | 5/2007 | Boesen et al. | |
| D549,222 S | 8/2007 | Huang | |
| D554,756 S | 11/2007 | Sjursen et al. | |
| 7,403,629 B1 | 7/2008 | Aceti et al. | |
| D579,006 S | 10/2008 | Kim et al. | |
| 7,463,902 B2 | 12/2008 | Boesen | |
| 7,508,411 B2 | 3/2009 | Boesen | |
| 7,532,901 B1 | 5/2009 | LaFranchise et al. | |
| D601,134 S | 9/2009 | Elabidi et al. | |
| 7,825,626 B2 | 11/2010 | Kozisek | |
| 7,859,469 B1 * | 12/2010 | Rosener | H01Q 1/22 343/702 |
| 7,965,855 B1 | 6/2011 | Ham | |
| 7,979,035 B2 | 7/2011 | Griffin et al. | |
| 7,983,628 B2 | 7/2011 | Boesen | |
| D647,491 S | 10/2011 | Chen et al. | |
| 8,095,188 B2 | 1/2012 | Shi | |
| 8,108,143 B1 | 1/2012 | Tester | |
| 8,140,357 B1 | 3/2012 | Boesen | |
| D666,581 S | 9/2012 | Perez | |
| 8,300,864 B2 | 10/2012 | Müllenborn et al. | |
| 8,406,448 B2 | 3/2013 | Lin et al. | |

(56) References Cited

U.S. PATENT DOCUMENTS

| | | |
|---|---|---|
| 8,430,817 B1 | 4/2013 | Al-Ali et al. |
| 8,436,780 B2 | 5/2013 | Schantz et al. |
| D687,021 S | 7/2013 | Yuen |
| 8,679,012 B1 | 3/2014 | Kayyali |
| 8,719,877 B2 | 5/2014 | VonDoenhoff et al. |
| 8,774,434 B2 | 7/2014 | Zhao et al. |
| 8,831,266 B1 | 9/2014 | Huang |
| 8,891,800 B1 | 11/2014 | Shaffer |
| 8,994,498 B2 | 3/2015 | Agrafioti et al. |
| D728,107 S | 4/2015 | Martin et al. |
| 9,013,145 B2 | 4/2015 | Castillo et al. |
| 9,037,125 B1 | 5/2015 | Kadous |
| D733,103 S | 6/2015 | Jeong et al. |
| 9,081,944 B2 | 7/2015 | Camacho et al. |
| 9,461,403 B2 | 10/2016 | Gao et al. |
| 9,510,159 B1 | 11/2016 | Cuddihy et al. |
| D773,439 S | 12/2016 | Walker |
| D775,158 S | 12/2016 | Dong et al. |
| D777,710 S | 1/2017 | Palmborg et al. |
| 9,544,689 B2 | 1/2017 | Fisher et al. |
| D788,079 S | 5/2017 | Son et al. |
| 9,684,778 B2 | 6/2017 | Tharappel et al. |
| 9,711,062 B2 | 7/2017 | Ellis et al. |
| 9,729,979 B2 * | 8/2017 | Ozden .................. H04R 25/554 |
| 9,767,709 B2 | 9/2017 | Ellis |
| 9,848,257 B2 * | 12/2017 | Ambrose ............. H04R 1/1016 |
| 2001/0005197 A1 | 6/2001 | Mishra et al. |
| 2001/0027121 A1 | 10/2001 | Boesen |
| 2001/0043707 A1 | 11/2001 | Leedom |
| 2001/0056350 A1 | 12/2001 | Calderone et al. |
| 2002/0002413 A1 | 1/2002 | Tokue |
| 2002/0007510 A1 | 1/2002 | Mann |
| 2002/0010590 A1 | 1/2002 | Lee |
| 2002/0030637 A1 | 3/2002 | Mann |
| 2002/0046035 A1 | 4/2002 | Kitahara et al. |
| 2002/0057810 A1 | 5/2002 | Boesen |
| 2002/0076073 A1 | 6/2002 | Taenzer et al. |
| 2002/0118852 A1 | 8/2002 | Boesen |
| 2003/0002705 A1 | 1/2003 | Boesen |
| 2003/0065504 A1 | 4/2003 | Kraemer et al. |
| 2003/0100331 A1 | 5/2003 | Dress et al. |
| 2003/0104806 A1 | 6/2003 | Ruef et al. |
| 2003/0115068 A1 | 6/2003 | Boesen |
| 2003/0125096 A1 | 7/2003 | Boesen |
| 2003/0218064 A1 | 11/2003 | Conner et al. |
| 2004/0070564 A1 | 4/2004 | Dawson et al. |
| 2004/0102931 A1 | 5/2004 | Ellis et al. |
| 2004/0160511 A1 | 8/2004 | Boesen |
| 2005/0017842 A1 | 1/2005 | Dematteo |
| 2005/0043056 A1 | 2/2005 | Boesen |
| 2005/0094839 A1 | 5/2005 | Gwee |
| 2005/0125320 A1 | 6/2005 | Boesen |
| 2005/0148883 A1 | 7/2005 | Boesen |
| 2005/0165663 A1 | 7/2005 | Razumov |
| 2005/0196009 A1 | 9/2005 | Boesen |
| 2005/0197063 A1 | 9/2005 | White |
| 2005/0212911 A1 | 9/2005 | Marvit et al. |
| 2005/0251455 A1 | 11/2005 | Boesen |
| 2005/0266876 A1 | 12/2005 | Boesen |
| 2006/0029246 A1 | 2/2006 | Boesen |
| 2006/0073787 A1 | 4/2006 | Lair et al. |
| 2006/0074671 A1 | 4/2006 | Farmaner et al. |
| 2006/0074808 A1 | 4/2006 | Boesen |
| 2006/0166715 A1 | 7/2006 | Engelen et al. |
| 2006/0166716 A1 | 7/2006 | Seshadri et al. |
| 2006/0220915 A1 | 10/2006 | Bauer |
| 2006/0258412 A1 | 11/2006 | Liu |
| 2007/0102009 A1 | 5/2007 | Wong et al. |
| 2007/0239225 A1 | 10/2007 | Saringer |
| 2007/0269785 A1 | 11/2007 | Yamanoi |
| 2008/0076972 A1 | 3/2008 | Dorogusker et al. |
| 2008/0090622 A1 | 4/2008 | Kim et al. |
| 2008/0102424 A1 | 5/2008 | Holljes |
| 2008/0146890 A1 | 6/2008 | LeBoeuf et al. |
| 2008/0187163 A1 | 8/2008 | Goldstein et al. |
| 2008/0215239 A1 | 9/2008 | Lee |
| 2008/0253583 A1 | 10/2008 | Goldstein et al. |
| 2008/0254780 A1 | 10/2008 | Kuhl et al. |
| 2008/0255430 A1 | 10/2008 | Alexandersson et al. |
| 2008/0298606 A1 | 12/2008 | Johnson et al. |
| 2009/0003620 A1 | 1/2009 | McKillop et al. |
| 2009/0008275 A1 | 1/2009 | Ferrari et al. |
| 2009/0017881 A1 | 1/2009 | Madrigal |
| 2009/0041313 A1 | 2/2009 | Brown |
| 2009/0073070 A1 | 3/2009 | Rofougaran |
| 2009/0097689 A1 | 4/2009 | Prest et al. |
| 2009/0105548 A1 | 4/2009 | Bart |
| 2009/0154739 A1 | 6/2009 | Zellner |
| 2009/0191920 A1 | 7/2009 | Regen et al. |
| 2009/0226017 A1 | 9/2009 | Abolfathi et al. |
| 2009/0240947 A1 | 9/2009 | Goyal et al. |
| 2009/0245559 A1 | 10/2009 | Boltyenkov et al. |
| 2009/0261114 A1 | 10/2009 | McGuire et al. |
| 2009/0296968 A1 | 12/2009 | Wu et al. |
| 2009/0303073 A1 | 12/2009 | Gilling et al. |
| 2009/0304210 A1 | 12/2009 | Weisman |
| 2010/0033313 A1 | 2/2010 | Keady et al. |
| 2010/0075631 A1 | 3/2010 | Black et al. |
| 2010/0166206 A1 | 7/2010 | Macours |
| 2010/0203831 A1 | 8/2010 | Muth |
| 2010/0210212 A1 | 8/2010 | Sato |
| 2010/0290636 A1 | 11/2010 | Mao et al. |
| 2010/0320961 A1 | 12/2010 | Castillo et al. |
| 2011/0018731 A1 | 1/2011 | Linsky et al. |
| 2011/0103609 A1 | 5/2011 | Pelland et al. |
| 2011/0137141 A1 | 6/2011 | Razoumov et al. |
| 2011/0140844 A1 | 6/2011 | McGuire et al. |
| 2011/0239497 A1 | 10/2011 | McGuire et al. |
| 2011/0286615 A1 | 11/2011 | Olodort et al. |
| 2011/0293105 A1 | 12/2011 | Ade et al. |
| 2012/0057740 A1 | 3/2012 | Rosal |
| 2012/0155670 A1 | 6/2012 | Rutschman |
| 2012/0159617 A1 | 6/2012 | Wu et al. |
| 2012/0163626 A1 | 6/2012 | Booij et al. |
| 2012/0197737 A1 | 8/2012 | LeBoeuf et al. |
| 2012/0235883 A1 | 9/2012 | Border et al. |
| 2012/0309453 A1 | 12/2012 | Maguire |
| 2013/0106454 A1 | 5/2013 | Liu et al. |
| 2013/0154826 A1 | 6/2013 | Ratajczyk |
| 2013/0178967 A1 | 7/2013 | Mentz |
| 2013/0200999 A1 | 8/2013 | Spodak et al. |
| 2013/0204617 A1 | 8/2013 | Kuo et al. |
| 2013/0293494 A1 | 11/2013 | Reshef |
| 2013/0316642 A1 | 11/2013 | Newham |
| 2013/0346168 A1 | 12/2013 | Zhou et al. |
| 2014/0004912 A1 | 1/2014 | Rajakarunanayake |
| 2014/0014697 A1 | 1/2014 | Schmierer et al. |
| 2014/0020089 A1 | 1/2014 | Perini, II |
| 2014/0072136 A1 | 3/2014 | Tenenbaum et al. |
| 2014/0072146 A1 | 3/2014 | Itkin et al. |
| 2014/0073429 A1 | 3/2014 | Meneses et al. |
| 2014/0079257 A1 | 3/2014 | Ruwe et al. |
| 2014/0106677 A1 | 4/2014 | Altman |
| 2014/0122116 A1 | 5/2014 | Smythe |
| 2014/0146973 A1 | 5/2014 | Liu et al. |
| 2014/0153768 A1 | 6/2014 | Hagen et al. |
| 2014/0163771 A1 | 6/2014 | Demeniuk |
| 2014/0185828 A1 | 7/2014 | Helbling |
| 2014/0219467 A1 | 8/2014 | Kurtz |
| 2014/0222462 A1 | 8/2014 | Shakil et al. |
| 2014/0235169 A1 | 8/2014 | Parkinson et al. |
| 2014/0270227 A1 | 9/2014 | Swanson |
| 2014/0270271 A1 | 9/2014 | Dehe et al. |
| 2014/0276227 A1 | 9/2014 | Perez |
| 2014/0310595 A1 | 10/2014 | Acharya et al. |
| 2014/0321682 A1 * | 10/2014 | Kofod-Hansen .... H04R 25/305 381/315 |
| 2014/0335908 A1 | 11/2014 | Krisch et al. |
| 2014/0348367 A1 | 11/2014 | Vavrus et al. |
| 2015/0028996 A1 | 1/2015 | Agrafioti et al. |
| 2015/0035643 A1 | 2/2015 | Kursun |
| 2015/0036835 A1 | 2/2015 | Chen |
| 2015/0056584 A1 | 2/2015 | Boulware et al. |
| 2015/0110587 A1 | 4/2015 | Hori |

(56) References Cited

U.S. PATENT DOCUMENTS

| | | |
|---|---|---|
| 2015/0148989 A1 | 5/2015 | Cooper et al. |
| 2015/0181356 A1 | 6/2015 | Krystek et al. |
| 2015/0230022 A1 | 8/2015 | Sakai et al. |
| 2015/0245127 A1 | 8/2015 | Shaffer |
| 2015/0256949 A1 | 9/2015 | Vanpoucke et al. |
| 2015/0264472 A1 | 9/2015 | Aase |
| 2015/0264501 A1 | 9/2015 | Hu et al. |
| 2015/0317565 A1 | 11/2015 | Li et al. |
| 2015/0358751 A1 | 12/2015 | Deng et al. |
| 2015/0359436 A1 | 12/2015 | Shim et al. |
| 2015/0364058 A1 | 12/2015 | Lagree et al. |
| 2015/0373467 A1 | 12/2015 | Gelter |
| 2015/0373474 A1 | 12/2015 | Kraft et al. |
| 2015/0379251 A1 | 12/2015 | Komaki |
| 2016/0033280 A1 | 2/2016 | Moore et al. |
| 2016/0034249 A1 | 2/2016 | Lee et al. |
| 2016/0071526 A1 | 3/2016 | Wingate et al. |
| 2016/0072558 A1 | 3/2016 | Hirsch et al. |
| 2016/0073189 A1 | 3/2016 | Linden et al. |
| 2016/0094550 A1 | 3/2016 | Bradley et al. |
| 2016/0100262 A1 | 4/2016 | Inagaki |
| 2016/0119737 A1 | 4/2016 | Mehnert et al. |
| 2016/0124707 A1 | 5/2016 | Ermilov et al. |
| 2016/0125892 A1 | 5/2016 | Bowen et al. |
| 2016/0140870 A1 | 5/2016 | Connor |
| 2016/0142818 A1 | 5/2016 | Park |
| 2016/0162259 A1 | 6/2016 | Zhao et al. |
| 2016/0209691 A1 | 7/2016 | Yang et al. |
| 2016/0253994 A1 | 9/2016 | Panchapagesan et al. |
| 2016/0324478 A1 | 11/2016 | Goldstein |
| 2016/0353196 A1 | 12/2016 | Baker et al. |
| 2016/0360350 A1 | 12/2016 | Watson et al. |
| 2017/0021257 A1 | 1/2017 | Gilbert et al. |
| 2017/0046503 A1 | 2/2017 | Cho et al. |
| 2017/0059152 A1 | 3/2017 | Hirsch et al. |
| 2017/0060262 A1 | 3/2017 | Hviid et al. |
| 2017/0060269 A1 | 3/2017 | Förstner et al. |
| 2017/0061751 A1 | 3/2017 | Loermann et al. |
| 2017/0061817 A1 | 3/2017 | Mettler May |
| 2017/0062913 A1 | 3/2017 | Hirsch et al. |
| 2017/0064426 A1 | 3/2017 | Hviid |
| 2017/0064428 A1 | 3/2017 | Hirsch |
| 2017/0064432 A1 | 3/2017 | Hviid et al. |
| 2017/0064437 A1 | 3/2017 | Hviid et al. |
| 2017/0078780 A1 | 3/2017 | Qian et al. |
| 2017/0078785 A1 | 3/2017 | Qian et al. |
| 2017/0100277 A1 | 4/2017 | Ke |
| 2017/0108918 A1 | 4/2017 | Boesen |
| 2017/0109131 A1 | 4/2017 | Boesen |
| 2017/0110124 A1 | 4/2017 | Boesen et al. |
| 2017/0110899 A1 | 4/2017 | Boesen |
| 2017/0111723 A1 | 4/2017 | Boesen |
| 2017/0111725 A1 | 4/2017 | Boesen et al. |
| 2017/0111726 A1 | 4/2017 | Martin et al. |
| 2017/0111740 A1 | 4/2017 | Hviid et al. |
| 2017/0127168 A1 | 5/2017 | Briggs et al. |
| 2017/0131094 A1 | 5/2017 | Kulik |
| 2017/0142511 A1 | 5/2017 | Dennis |
| 2017/0146801 A1 | 5/2017 | Stempora |
| 2017/0150920 A1 | 6/2017 | Chang et al. |
| 2017/0151085 A1 | 6/2017 | Chang et al. |
| 2017/0151447 A1 | 6/2017 | Boesen |
| 2017/0151668 A1 | 6/2017 | Boesen |
| 2017/0151918 A1 | 6/2017 | Boesen |
| 2017/0151930 A1 | 6/2017 | Boesen |
| 2017/0151957 A1 | 6/2017 | Boesen |
| 2017/0151959 A1 | 6/2017 | Boesen |
| 2017/0153114 A1 | 6/2017 | Boesen |
| 2017/0153636 A1 | 6/2017 | Boesen |
| 2017/0154532 A1 | 6/2017 | Boesen |
| 2017/0155985 A1 | 6/2017 | Boesen |
| 2017/0155992 A1 | 6/2017 | Perianu et al. |
| 2017/0155993 A1 | 6/2017 | Boesen |
| 2017/0155997 A1 | 6/2017 | Boesen |
| 2017/0155998 A1 | 6/2017 | Boesen |
| 2017/0156000 A1 | 6/2017 | Boesen |
| 2017/0164890 A1 | 6/2017 | Leip et al. |
| 2017/0178631 A1 | 6/2017 | Boesen |
| 2017/0180842 A1 | 6/2017 | Boesen |
| 2017/0180843 A1 | 6/2017 | Perianu et al. |
| 2017/0180897 A1 | 6/2017 | Perianu |
| 2017/0188127 A1 | 6/2017 | Perianu et al. |
| 2017/0188132 A1 | 6/2017 | Hirsch et al. |
| 2017/0193978 A1 | 7/2017 | Goldman |
| 2017/0195829 A1 | 7/2017 | Belverato et al. |
| 2017/0208393 A1 | 7/2017 | Boesen |
| 2017/0214987 A1 | 7/2017 | Boesen |
| 2017/0215016 A1 | 7/2017 | Dohmen et al. |
| 2017/0230752 A1 | 8/2017 | Dohmen et al. |
| 2017/0251933 A1 | 9/2017 | Braun et al. |
| 2017/0257698 A1 | 9/2017 | Boesen et al. |
| 2017/0258329 A1 | 9/2017 | Marsh |
| 2017/0263236 A1 | 9/2017 | Boesen et al. |
| 2017/0263376 A1 | 9/2017 | Verschueren et al. |
| 2017/0266494 A1 | 9/2017 | Crankson et al. |
| 2017/0273622 A1 | 9/2017 | Boesen |
| 2017/0280257 A1 | 9/2017 | Gordon et al. |
| 2017/0301337 A1 | 10/2017 | Golani et al. |
| 2017/0361213 A1 | 12/2017 | Goslin et al. |
| 2017/0366233 A1 | 12/2017 | Hviid et al. |
| 2018/0007994 A1 | 1/2018 | Boesen et al. |
| 2018/0008194 A1 | 1/2018 | Boesen |
| 2018/0008198 A1 | 1/2018 | Kingscott |
| 2018/0009447 A1 | 1/2018 | Boesen et al. |
| 2018/0011006 A1 | 1/2018 | Kingscott |
| 2018/0011682 A1 | 1/2018 | Milevski et al. |
| 2018/0011994 A1 | 1/2018 | Boesen |
| 2018/0012228 A1 | 1/2018 | Milevski et al. |
| 2018/0013195 A1 | 1/2018 | Hviid et al. |
| 2018/0014102 A1 | 1/2018 | Hirsch et al. |
| 2018/0014103 A1 | 1/2018 | Martin et al. |
| 2018/0014104 A1 | 1/2018 | Boesen et al. |
| 2018/0014107 A1 | 1/2018 | Razouane et al. |
| 2018/0014108 A1 | 1/2018 | Dragicevic et al. |
| 2018/0014109 A1 | 1/2018 | Boesen |
| 2018/0014113 A1 | 1/2018 | Boesen |
| 2018/0014140 A1 | 1/2018 | Milevski et al. |
| 2018/0014436 A1 | 1/2018 | Milevski |
| 2018/0034951 A1 | 2/2018 | Boesen |
| 2018/0040093 A1 | 2/2018 | Boesen |
| 2018/0042501 A1 | 2/2018 | Adi et al. |

FOREIGN PATENT DOCUMENTS

| | | |
|---|---|---|
| CN | 104837094 A | 8/2015 |
| EP | 1469659 A1 | 10/2004 |
| EP | 1017252 A3 | 5/2006 |
| EP | 2903186 A1 | 8/2015 |
| GB | 2074817 | 4/1981 |
| GB | 2508226 A | 5/2014 |
| JP | 06292195 | 10/1998 |
| WO | 2008103925 A1 | 8/2008 |
| WO | 2008113053 A1 | 9/2008 |
| WO | 2007034371 A3 | 11/2008 |
| WO | 2011001433 A2 | 1/2011 |
| WO | 2012071127 A1 | 5/2012 |
| WO | 2013134956 A1 | 9/2013 |
| WO | 2014046602 A1 | 3/2014 |
| WO | 2014043179 A3 | 7/2014 |
| WO | 2015061633 A2 | 4/2015 |
| WO | 2015110577 A1 | 7/2015 |
| WO | 2015110587 A1 | 7/2015 |
| WO | 2016032990 A1 | 3/2016 |
| WO | 2016187869 A1 | 12/2016 |

OTHER PUBLICATIONS

Stretchgoal—Windows Phone Support (Feb. 17, 2014).
The Dash + The Charging Case & The BRAGI News (Feb. 21, 2014).
The Dash-A Word From Our Software, Mechanical and Acoustics Team + An Update (Mar. 11, 2014).
Update From BRAGI—$3,000,000—Yipee (Mar. 22, 2014).

(56) References Cited

OTHER PUBLICATIONS

Weisiger; "Conjugated Hyperbilirubinemia", Jan. 5, 2016.
Wertzner et al., "Analysis of fundamental frequency, jitter, shimmer and vocal intensity in children with phonological disorders", V. 71, n.5, 582-588, Sep./Oct. 2005; Brazilian Journal of Othrhinolaryngology.
Wikipedia, "Gamebook", https://en.wikipedia.org/wiki/Gamebook, Sep. 3, 2017, 5 pages.
Wikipedia, "Kinect", "https://en.wikipedia.org/wiki/Kinect", 18 pages, (Sep. 9, 2017).
Wikipedia, "Wii Balance Board", "https://en.wikipedia.org/wiki/Wii_Balance_Board", 3 pages, (Jul. 20, 2017).
Akkermans, "Acoustic Ear Recognition for Person Identification", Automatic Identification Advanced Technologies, 2005 pp. 219-223.
Alzahrani et al: "A Multi-Channel Opto-Electronic Sensor to Accurately Monitor Heart Rate against Motion Artefact during Exercise", Sensors, vol. 15, No. 10, Oct. 12, 2015, pp. 25681-25702, XP055334602, DOI: 10.3390/s151025681 the whole document.
Announcing the $3,333,333 Stretch Goal (Feb. 24, 2014).
Ben Coxworth: "Graphene-based ink could enable low-cost, foldable electronics", "Journal of Physical Chemistry Letters", Northwestern University, (May 22, 2013).
Blain: "World's first graphene speaker already superior to Sennheiser MX400", htt://www.gizmag.com/graphene-speaker-beats-sennheiser-mx400/31660, (Apr. 15, 2014).
BMW, "BMW introduces BMW Connected—The personalized digital assistant", "http://bmwblog.com/2016/01/05/bmw-introduces-bmw-connected-the-personalized-digital-assistant", (Jan. 5, 2016).
BRAGI Is On Facebook (2014).
BRAGI Update—Arrival of Prototype Chassis Parts—More People—Awesomeness (May 13, 2014).
BRAGI Update—Chinese New Year, Design Verification, Charging Case, More People, Timeline(Mar. 6, 2015).
BRAGI Update—First Sleeves From Prototype Tool—Software Development Kit (Jun. 5, 2014).
BRAGI Update—Let's Get Ready To Rumble, A Lot To Be Done Over Christmas (Dec. 22, 2014).
BRAGI Update—Memories From April—Update On Progress (Sep. 16, 2014).
BRAGI Update—Memories from May—Update On Progress—Sweet (Oct. 13, 2014).
BRAGI Update—Memories From One Month Before Kickstarter—Update On Progress (Jul. 10, 2014).
BRAGI Update—Memories From The First Month of Kickstarter—Update on Progress (Aug. 1, 2014).
BRAGI Update—Memories From The Second Month of Kickstarter—Update On Progress (Aug. 22, 2014).
BRAGI Update—New People @BRAGI—Prototypes (Jun. 26, 2014).
BRAGI Update—Office Tour, Tour To China, Tour to CES (Dec. 11, 2014).
BRAGI Update—Status On Wireless, Bits and Pieces, Testing-Oh Yeah, Timeline(Apr. 24, 2015).
BRAGI Update—The App Preview, The Charger, The SDK, BRAGI Funding and Chinese New Year (Feb. 11, 2015).
BRAGI Update—What We Did Over Christmas, Las Vegas & CES (Jan. 19, 2014).
BRAGI Update—Years of Development, Moments of Utter Joy and Finishing What We Started(Jun. 5, 2015).
BRAGI Update—Alpha 5 and Back To China, Backer Day, On Track(May 16, 2015).
BRAGI Update—Beta2 Production and Factory Line(Aug. 20, 2015).
BRAGI Update—Certifications, Production, Ramping Up.
BRAGI Update—Developer Units Shipping and Status(Oct. 5, 2015).
BRAGI Update—Developer Units Started Shipping and Status (Oct. 19, 2015).
BRAGI Update—Developer Units, Investment, Story and Status(Nov. 2, 2015).
BRAGI Update—Getting Close(Aug. 6, 2015).
BRAGI Update—On Track, Design Verification, How It Works and What's Next(Jul. 15, 2015).
BRAGI Update—On Track, On Track and Gems Overview.
BRAGI Update—Status On Wireless, Supply, Timeline and Open House@BRAGI(Apr. 1, 2015).
BRAGI Update—Unpacking Video, Reviews On Audio Perform and Boy Are We Getting Close(Sep. 10, 2015).
Healthcare Risk Management Review, "Nuance updates computer-assisted physician documentation solution" (Oct. 20, 2016).
Hoffman, "How to Use Android Beam to Wirelessly Transfer Content Between Devices", (Feb. 22, 2013).
Hoyt et. al., "Lessons Learned from Implementation of Voice Recognition for Documentation in the Military Electronic Health Record System", The American Health Information Management Association (2017).
Hyundai Motor America, "Hyundai Motor Company Introduces A Health + Mobility Concept For Wellness In Mobility", Fountain Valley, Californa (2017).
International Search Report & Written Opinion, PCT/EP16/70245 (dated Nov. 16, 2016).
International Search Report & Written Opinion, PCT/EP2016/070231 (dated Nov. 18, 2016).
International Search Report & Written Opinion, PCT/EP2016/070247 (dated Nov. 18, 2016).
International Search Report & Written Opinion, PCT/EP2016/07216 (dated Oct. 18, 2016).
International Search Report and Written Opinion, PCT/EP2016/070228 (dated Jan. 9, 2017).
Jain A et al: "Score normalization in multimodal biometric systems", Pattern Recognition, Elsevier, GB, vol. 38, No. 12, Dec. 31, 2005, pp. 2270-2285, XP027610849, ISSN: 0031-3203.
Last Push Before The Kickstarter Campaign Ends on Monday 4pm CET (Mar. 28, 2014).
LOVEJOY: "Touch ID built into iPhone display one step closer as third-party company announces new tech", "http://9to5mac.com/2015/07/21/virtualhomebutton/" (Jul. 21, 2015).
Nemanja Paunovic et al, "A methodology for testing complex professional electronic systems", Serbian Journal of Electrical Engineering, vol. 9, No. 1, Feb. 1, 2012, pp. 71-80, XP055317584, Yu.
Nigel Whitfield: "Fake tape detectors, 'from the stands' footie and UGH? Internet of Things in my set-top box"; http://www.theregisterco.uk/2014/09/24/ibc_round_up_object_audio_dlna iot/ (Sep. 24, 2014).
Nuance, "ING Netherlands Launches Voice Biometrics Payment System in the Mobile Banking App Powered by Nuance", "https://www.nuance.com/about-us/newsroom/press-releases/ing-netherlands-launches-nuance-voice-biometirics.html", 4 pages (Jul. 28, 2015).
Staab, Wayne J., et al., "A One-Size Disposable Hearing Aid is Introduced", The Hearing Journal 53(4):36-41) Apr. 2000.
Stretchgoal—It's Your Dash (Feb. 14, 2014).

* cited by examiner

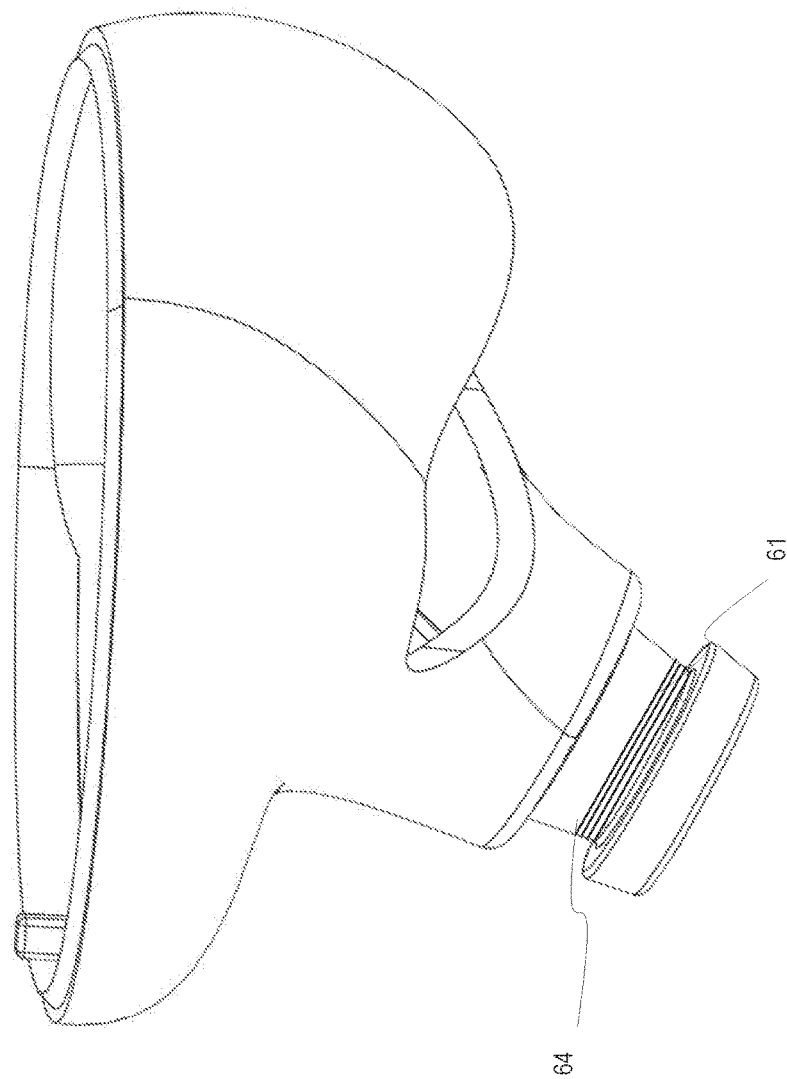

ANTENNA FOR USE IN A WEARABLE DEVICE

PRIORITY STATEMENT

This application claims priority to U.S. Provisional Patent Application No. 62/211,725 filed on Aug. 29, 2015 titled Magnetic Induction Antenna for use in a Wearable Device, U.S. Provisional Patent Application No. 62/254,591 filed on Nov. 12, 2015 titled Wireless Earpieces and Cradle, U.S. patent application Ser. No. 14/941,639 filed on Nov. 15, 2015 titled Magnetic Induction Antenna for use in a Wearable Device, P.C.T. Application No. PCT/EP2016/070216 filed on Aug. 26, 2016 titled Magnetic Induction Antenna for Use in a Wearable Device and is a continuation of U.S. patent application Ser. No. 15/349,975 filed on Nov. 11, 2016 titled Antenna for Use in a Wearable Device all of which are hereby incorporated by reference in their entireties.

FIELD OF THE INVENTION

The present invention relates to antenna. More particularly, but not exclusively, the present invention relates to an antenna for use in a wearable device such as an ear piece.

BACKGROUND OF THE ART

Various types of wireless communication linkages exist. However, there can be numerous issues when used in environments and/or applications. For example, in the case of wearable devices where a left earpiece is to communicate with a right earpiece there may be issues using Bluetooth wireless transceivers due to a combination of factors involving attenuation, reliability in varied environments and sensitivity. An alternative approach is to use near field magnetic induction (NFMI). NFMI is unaffected by body tissues and demonstrates improved sensitivity. However, use of NFMI introduces additional problems. For example, the placement of the antenna may be problematic. Magnetic fields induced by the PCB limits the areas of the wearable device capable of providing optimal electromagnetic field generation. In addition, there are concerns regarding the possibility of additional interference generated from other related electronic components.

SUMMARY OF THE INVENTION

Therefore, it is a primary object, feature, or advantage of the present invention to improve over the state of the art.

It is a further object, feature, or advantage of the present invention to provide for an improved wearable device.

It is a still further object, feature, or advantage of the present invention to provide an antenna for NFMI suitable for use in a wearable device to allow for communication with other wearable devices.

Another object, feature, or advantage of the present invention is to provide an antenna for induction which avoids magnetic fields induced by the printed circuit board and other electronic components associated with a wearable device.

Yet another object, feature, or advantage of the present invention is to provide for improved placement of an antenna within a wearable device for improved orientation of the electromagnetic field.

A further object, feature, or advantage of the present invention is to provide for an antenna sufficiently powerful for expected tasks and is straightforward in its manufacturing and assembly.

A still further object, feature or advantage of the present invention is position an antenna relative to a Bluetooth antenna to facilitate enhancement of Bluetooth reception by the Bluetooth antenna.

Another object, feature, or advantage of the present invention is to position an antenna in the posterior superior segment of a wearable to allow for reliable bilateral transmission of audio and data to another wearable device.

Yet another object, feature, or advantage of the present invention is to provide a common ground plane between two wearable devices to allow for expansion of the electromagnetic field.

A further object, feature, or advantage of the present invention is to provide for antenna contact with the skin of a user wearing the wearable device to extend the electromagnetic field.

A still further object, feature, or advantage of the present invention is to allow for coils to be positioned in various places.

Another object, feature, or advantage of the present invention is to orient an antenna perpendicular to other electronic components to minimize electromagnetic interference with the other components.

Yet another object, feature, or advantage of the present invention is to orient an antenna at the perimeter of a PCB to limit the electromagnetic field interference.

One of these and/or other objects, features, or advantages of the present invention will become apparent from the specification and claims following. It is to be understood different embodiments are disclosed herein, and no embodiment need meet every object, feature, or advantage as set forth herein. Different embodiments may have different objects, features, or advantages.

According to one aspect an earpiece is provided. The earpiece includes a housing, a first short-range transceiver for far field communication disposed within the housing, and a second short range transceiver for near field communication disposed within the housing. The second short range transceiver for near field communications comprises an antenna formed from a plurality of coil turns. There is a battery disposed within the housing. The earpiece further includes a first generally planar printed circuit board disposed within the housing and having a first plurality of components mounted thereto and a second generally planar printed circuit board disposed within the housing and having a second plurality of components mounted thereto. There is a flexible connector between the first generally planar circuit board and the second generally planar circuit board for providing electrical connections therebetween. The battery is positioned between the first generally planar printed circuit board and the second generally planar printed circuit board. The antenna is mounted perpendicularly to the plurality of components mounted on the first generally planar printed circuit board to thereby reduce electromagnetic interference. The antenna may be mounted at a posterosuperior portion of the earpiece device. The antenna may be mounted between the first generally planar printed circuit board and the second generally planar printed circuit board along an edge of the battery. The plurality of coil turns may be wrapped around a ferrite material such a structure formed from a sheet of ferrite material. The coil turns may be wrapped around the battery or wrapped around a spacer which is positioned around the battery. The ear piece may include a balanced armature speaker and the coil turns may be wrapped around the balanced armature speaker. The coil turns may instead be wrapped around a portion of the housing such as a tip portion of the housing. The first short range transceiver may be a Bluetooth transceiver and the second short range transceiver may be a near field magnetic induction (NFMI) transceiver. The earpiece may further include a memory for storing audio files, the memory disposed within the housing and the audio files may be played back through the earpieces.

BRIEF DESCRIPTION OF THE DRAWINGS

FIG. 11 illustrates a portion of an earpiece housing with antenna coils wrapped around tips of the ear piece housing.

DETAILED DESCRIPTION

The present invention relates to a wearable device such as an earpiece having an antenna. Although generally described herein with respect to a near field magnetic induction (NFMI) antenna for use in an ear piece within a set of ear pieces, it is to be understood the present invention is not limited to specific applications and may be used as an antenna for induction in other types of devices including other types of wearable devices.

Figure 1:
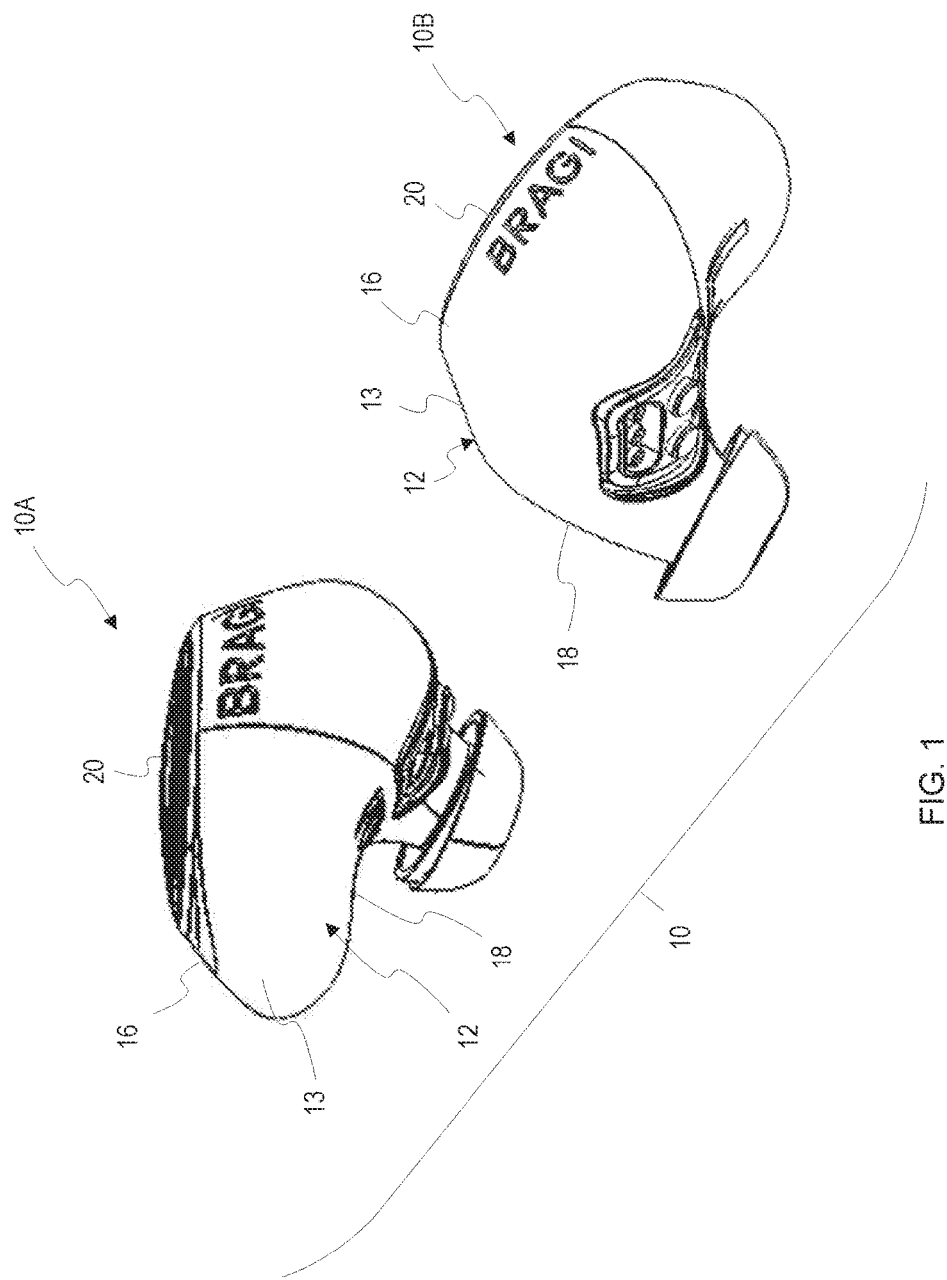
FIG. 1 illustrates one example of a system including two wearable devices in the form of left and right ear pieces which bi-directionally communicate with each other.
Figure 2:
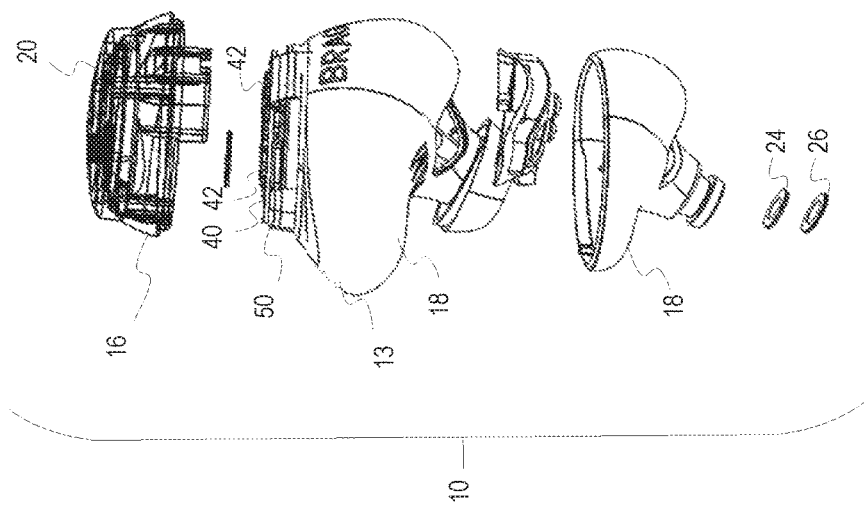
FIG. 2 is an exploded view of a wearable device.

FIG. 1. illustrates one example of a system 10 which includes a first wearable device 10A in the form of an ear piece and a second wearable device 10B in the form of an ear piece, each having an ear piece housing 12 with a central portion 13 with an upper portion 16 and a lower portion 18. A light guide assembly 20 is shown operatively connected to the housing to provide for selective illumination to provide feedback to a user. FIG. 2 provides an exploded view of the wearable device 10A. A waterproof pad 24 and protection mesh 26 are shown. In addition in the central or main portion 13 of the wearable device 10A a printed circuit board 40 is shown with a plurality of electronic components 42 mounted thereto. The plurality of electronic components 42 may include a short range transceiver configured for far field communications such as a wireless radio such as a Bluetooth transceiver, an ultra-wideband (UWB), or other type of transceiver. A near field magnetic induction (NFMI) antenna 50 is mounted at an edge or perimeter of the printed circuit board 40. The NFMI antenna 50 is mounted at a postero-superior portion of the wearable device 10A.

The system 10 allows for near field communication of audio channels between the left and right-sided wearable devices 10A, 10B. Other types of data may also be communicated between the left and right-sided wearable devices 10A, 10B if desired including sensor information or other data.

Figure 3:
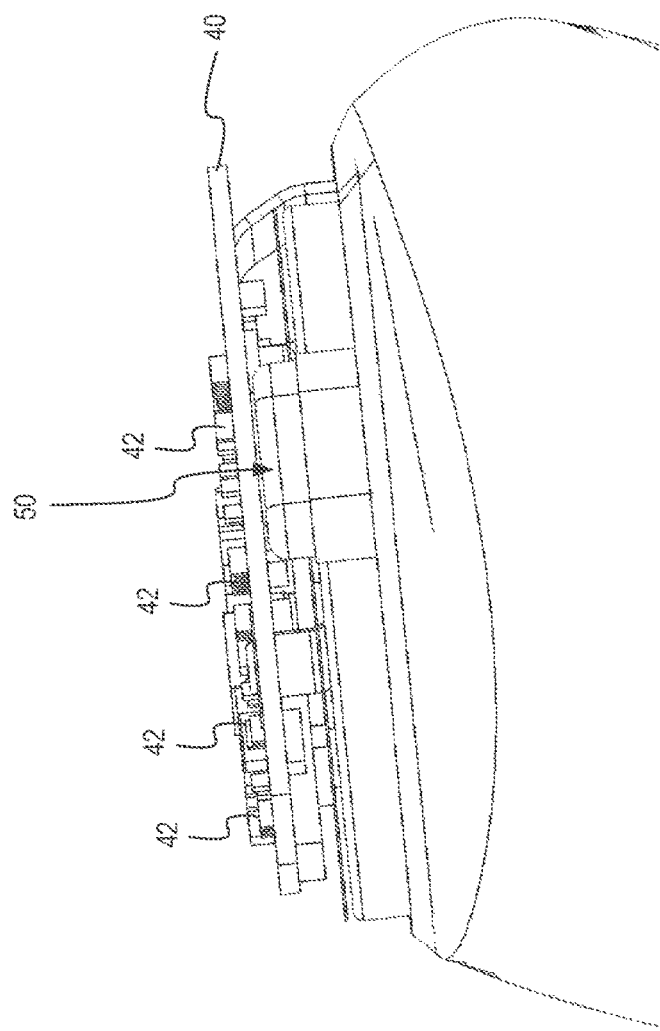
FIG. 3 illustrates a printed circuit board of the wearable device positioned relative to an induction circuit/antenna.
Figure 4:
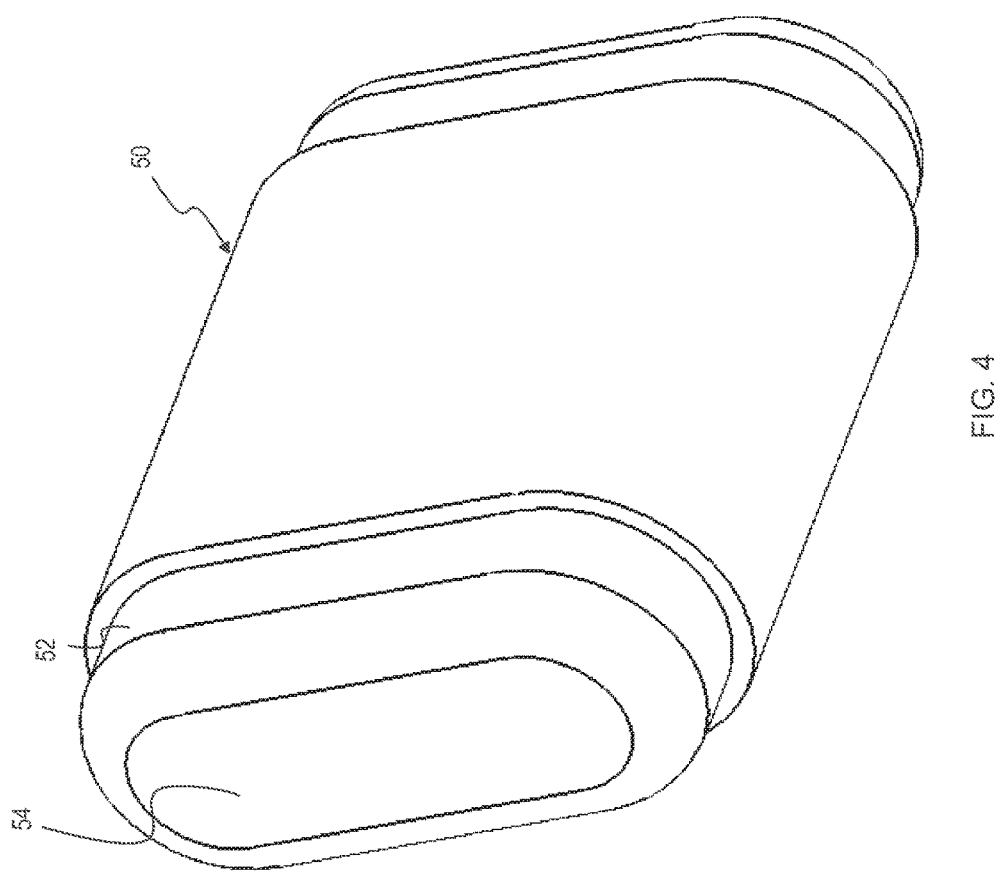
FIG. 4 illustrates a core.
Figure 5:
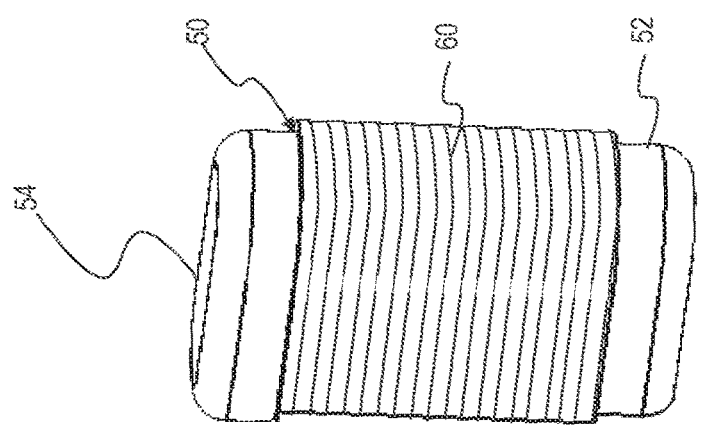
FIG. 5 illustrates a core with coil turns thereon.

FIG. 3 illustrates another view of the printed circuit board 40 with electronic components 42. A NFMI antenna 50 is shown mounted at an edge or perimeter of the printed circuit board 40. The printed circuit board is generally planar. Note that the NFMI antenna 50 is mounted perpendicularly or orthogonally to the top surface of printed circuit board 40 and the plurality of components 42 mounted thereto. Positioning the NFMI antenna 50 in this relationship provides for reducing electromagnetic interference. The core of the NFMI antenna 50 may be formed or a ferrite material. For example, the core of the NFMI antenna 50 may be a ferrite sheet magnetic spacer. As shown in FIG. 4, where the core of the NFMI antenna 50 includes ferrite sheet magnetic spacer 52, an exterior of the NFMI antenna 50 may be positioned over or wrapped around a battery 54. As shown in FIG. 5, a plurality of coil turns 60 may be wrapped around the battery 54 that is the core of the NFMI antenna 50. The coil turns 60 wrapped around the battery 54 (or other core) form the NFMI antenna 50.

As shown in FIG. 4, the transceiver 50 has a plurality of coil turns 60 wrapped around the ferrite material 52. As shown in FIG. 4, the coil turns 60 may be tightly wrapped with respect to one another and thus separation between individual coil turns is not shown. The transceiver 50 may be positioned adjacent to the battery 54. As shown in FIG. 5, a plurality of coil turns 60 may be wrapped around the ferrite material 52. The transceiver 50 is positioned adjacent a battery 54.

In one embodiment NFMI may be used for the communication and audio channels between the left and right sided wearable devices. Placement of the coil at the perimeter of the wearable improves the electromagnetic field, avoiding degradation from adjacent onboard electronics. This allows for optimal placement of the magnetic field for transmission and reception between the left and right wearable. The preferred embodiment allows for precise positioning within the device for optimal orientation for the electromagnetic field. Further, the preferred embodiment also allows for an NFMI antenna sufficiently powerful for the expected tasks and is straightforward in its manufacturing and assembly.

Figure 6:
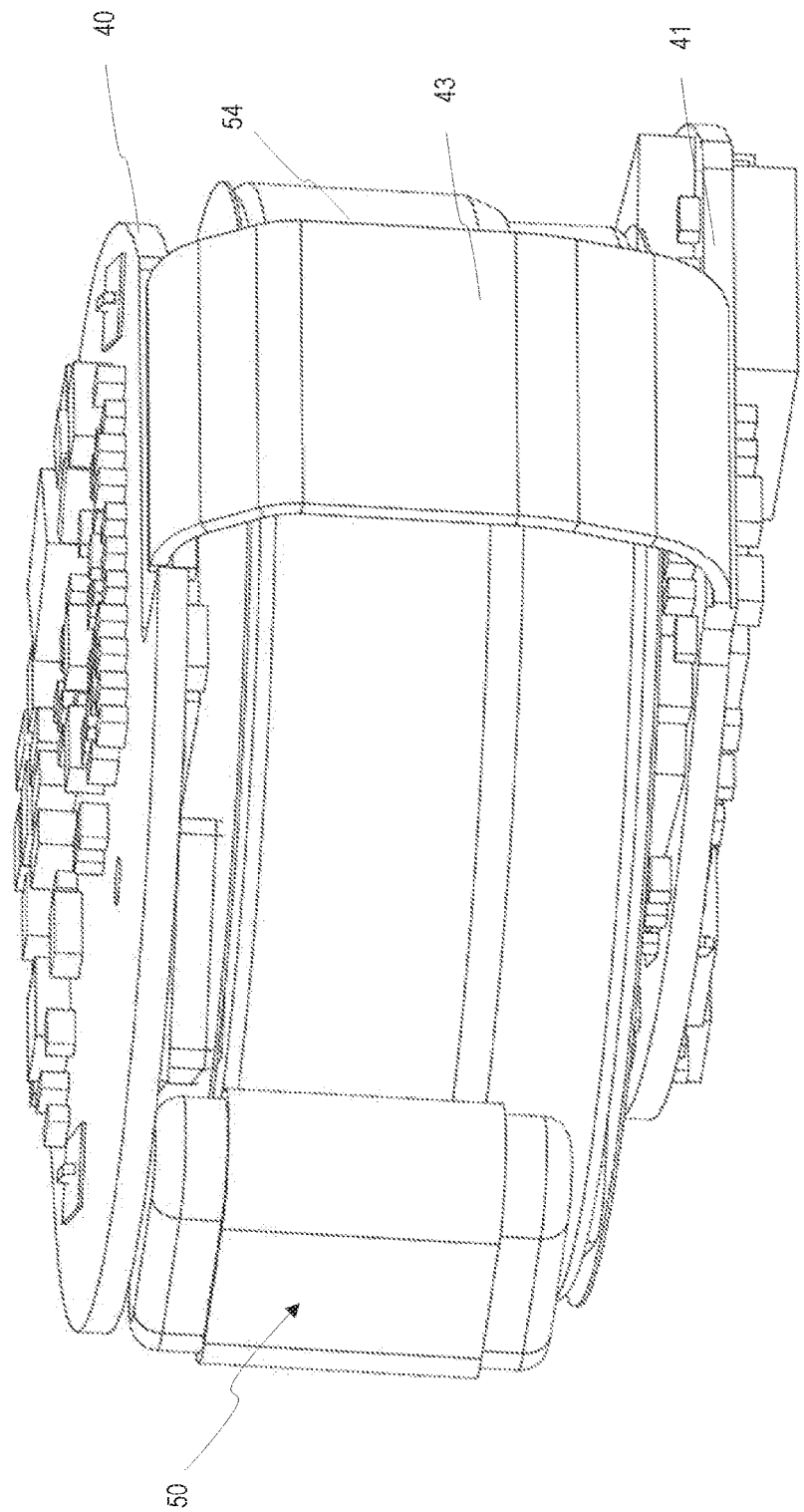
FIG. 6 illustrates printed circuit boards on opposite sides of a battery with an antenna wrapped around the battery.

FIG. 6 illustrates printed circuit boards on opposite sides of a battery with an antenna positioned around the battery. A first printed circuit board 40 is shown as well as a second printed circuit board 41. There is a flexible connector 43 between the first printed circuit board 40 and the second printed circuit board 41 to provide electrical connections therebetween. The transceiver 50 is positioned at an outer portion of the battery and may be positioned adjacent or near to a radio transceiver on the printed circuit board 40.

Figure 7:
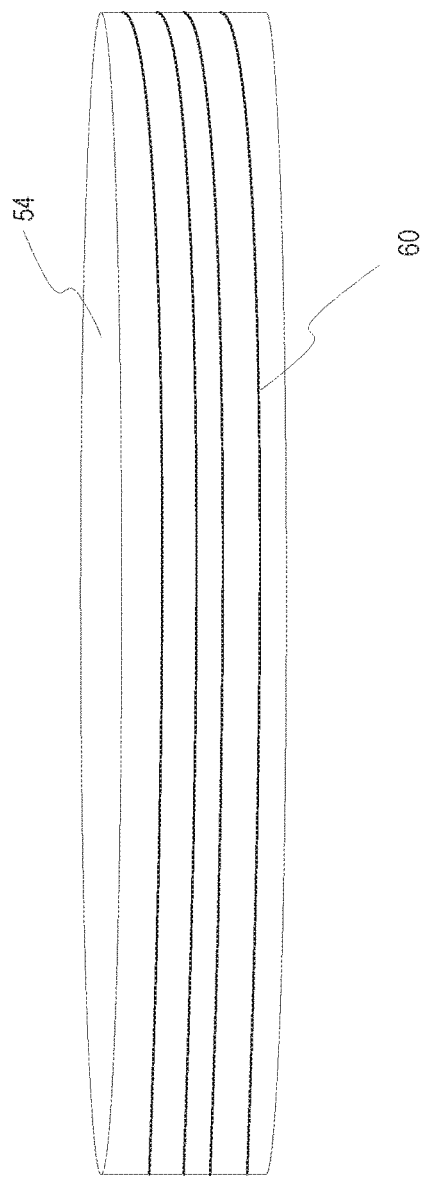
FIG. 7 illustrates another example of a battery with antenna coils wrapped around the battery.

FIG. 7 illustrates another example of a battery 54 with antenna coils 60 wrapped around the battery 54. In this embodiment, the battery such as the one shown in FIG. 6 is positioned between circuit boards and may be wrapped such as in a ferrite tape, but the ferrite tape need not be present. Alternatively, for example, a spacer may be used between the battery and the antenna coils with the coils wrapped around the spacer positioned around the battery. Thus, instead of the transceiver being placed next to the battery, the transceiver is formed by wrapping the coils 60 around the battery 54.

Figure 8:
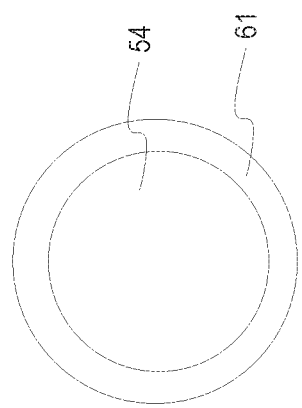
FIG. 8 and FIG. 9 illustrates an example of a spacer positioned around a battery with antenna coils wrapped around the space.
Figure 9:
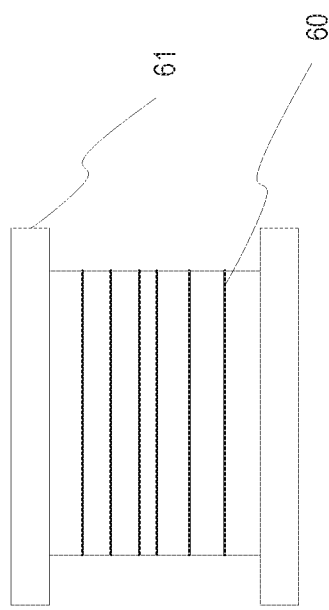

FIG. 8 illustrates an example of a top view of spacer 61 positioned around a battery 54. FIG. 9 illustrates the spacer 61 with antenna coils 60 wrapped around it (and thus around the battery about which the spacer 61 is positioned. Thus, instead of directly wrapping antenna coils 60 around a battery 54, antenna coils 60 may be wrapped around a spacer 61 which in turn is positioned around a battery 54.

Figure 10:
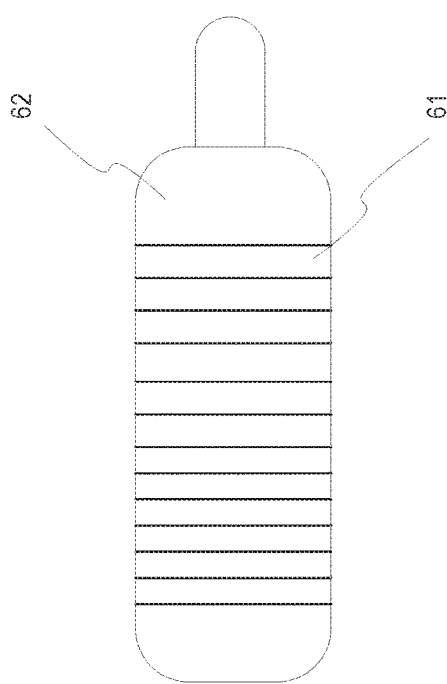
FIG. 10 illustrates a balanced armature speaker with antenna coils wrapped around the balanced armature speaker.

FIG. 10 illustrates a balanced armature speaker 62 with antenna coils 61 wrapped around the balanced armature speaker 62. The armature speaker 62 may be positioned within the earpiece housing and this provides an alternative location for placement of the transceiver formed using the antenna coils 61.

FIG. 11 illustrates a portion of an earpiece housing with antenna coils 61 wrapped around a tip 64 of the ear piece housing.

In addition, the antenna coils may be positioned in other locations in the earpiece including around the earpiece housing or case or portions thereof. The various locations of the earpiece may be wrapped in a ferrite tape prior to wrapping the antenna coils around the location. Generally, the location should allow for a coil with circular or substantially circular cross-section to be performed.

Testing was performed on various locations for the coils to determine a range where there was 100 percent and a range where there was 0 percent reception. Testing was performed both in open air between two different NFMI transceivers as well as in active wireless earpieces. In addition, testing was performed under varying conditions such as mode of operation of the device (e.g. playing music) at different power settings. The earpiece may include as a part of the circuitry on one of the printed circuit boards a memory for storing music files which may be played back. It is noted this circuitry as well as processing circuitry and other circuitry may be the source of interference to near field communications. The results of the testing indicate the antenna may be placed at these various locations throughout the earpiece although different locations as well as other factors may result in different reliable ranges.

Therefore, a wearable device has been shown and described and a system including multiple ear pieces which communicate with one another has also been shown and described. It is to be understood the present invention contemplates numerous variations, options, and alternatives. The present invention is not to be limited to the specific embodiments and examples set forth herein.

What is claimed is:

1. A method for assembling an earpiece, comprising the steps of:
    forming an antenna from a plurality of coil turns wrapped around a core, wherein the antenna is part of a short-range transceiver for near field communications;
    mounting a first plurality of components to a first generally planar printed circuit board;
    mounting a second plurality of components to a second generally planar printed circuit board;
    coupling a flexible connector between the first generally planar circuit board and the second generally planar circuit board for providing electrical connections therebetween;
    positioning a battery between the first generally planar printed circuit board and the second generally planar printed circuit board;
    mounting the antenna perpendicularly to the plurality of components mounted on the first generally planar printed circuit board to thereby reduce electromagnetic interference; and
    placing within a housing a short-range transceiver for far field communication, the short-range transceiver for near field communication, and the first and second generally planar printed circuit boards coupled by the flexible connector having the battery in between.

2. The method of claim 1, further comprising the step of mounting the antenna at a posterosuperior portion of the earpiece device.

3. The method of claim 1, further comprising the step of mounting the antenna between the first generally planar printed circuit board and the second generally planar printed circuit board along an edge of the battery.

4. The method of claim 1, further comprising the step of wrapping the plurality of coil turns around a ferrite material that is the core.

5. The method of claim 4 wherein the ferrite material comprises a magnetic spacer.

6. The method of claim 1, further comprising the step of wrapping the plurality of coil turns around the battery that is the core.

7. The method of claim 1, further comprising the step of wrapping the plurality of coil turns around the core including a spacer which is wrapped around the battery.

8. The method of claim 1 further comprising wrapping the plurality of coil turns around a balanced armature speaker positioned perpendicularly to the plurality of components.

9. The method of claim 1, further comprising wrapping the plurality of coil turns around a portion of the housing.

10. The method of claim 9, further comprising wrapping the plurality of coil turns around a tip portion of the housing.

11. The method of claim 1 wherein the short range transceiver for far field communication is a Bluetooth transceiver.

12. The method of claim 1 wherein the short range transceiver for near field communications is a near field magnetic induction (NFMI) transceiver.

13. The method of claim 1 wherein the earpiece is a right earpiece.

14. A method for assembling a wearable device comprising the steps of:
    wrapping a plurality of coil turns around a core for a near field magnetic induction antenna;
    mounting a plurality of components to a printed circuit board;
    mounting the near field magnetic induction antenna perpendicularly to a plane associated with a short-range transceiver mounted on the printed circuit board to thereby reduce electromagnetic interference; and
    placing within a housing, the short-range transceiver, the printed circuit board and the near field magnetic induction antenna.

15. The method of claim 14, wherein the wearable device is an earpiece.

16. The method of claim 15, further comprising the step of mounting the core associated with the near field magnetic induction antenna at a posteosuperior portion of the earpiece.

17. The method of claim 14, further comprising the step of wrapping the plurality of coil turns are around a ferrite magnetic shield spacer surrounding a battery.

18. The method of claim 14, further comprising the step of mounting the core associated with the near field magnetic induction antenna at a perimeter of the printed circuit board.

19. The method of claim 14, wherein the short-range transceiver is a Bluetooth transceiver.

\* \* \* \* \*